J. T. LALLY.
BOTTLE WASHING MACHINE.
APPLICATION FILED SEPT. 23, 1916.
1,242,817.
Patented Oct. 9, 1917.
7 SHEETS—SHEET 3.
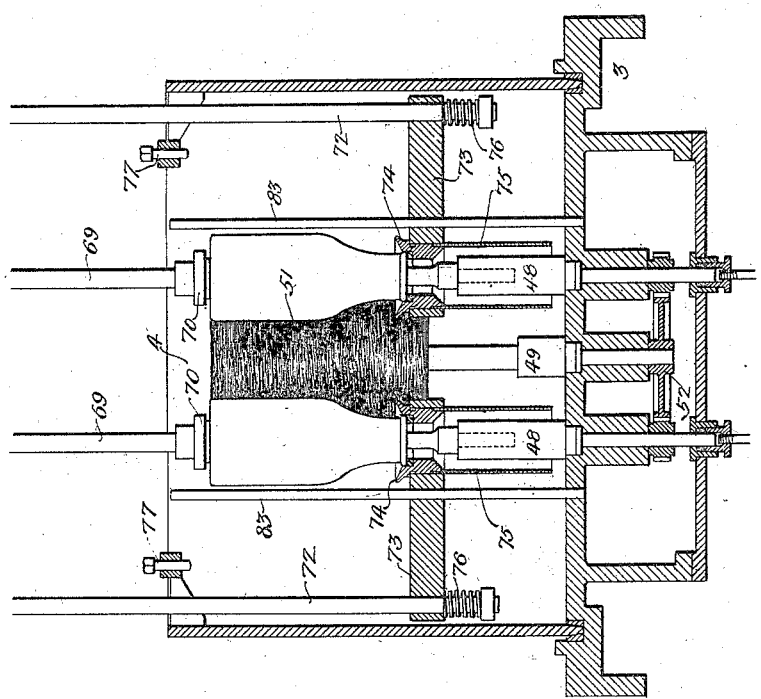
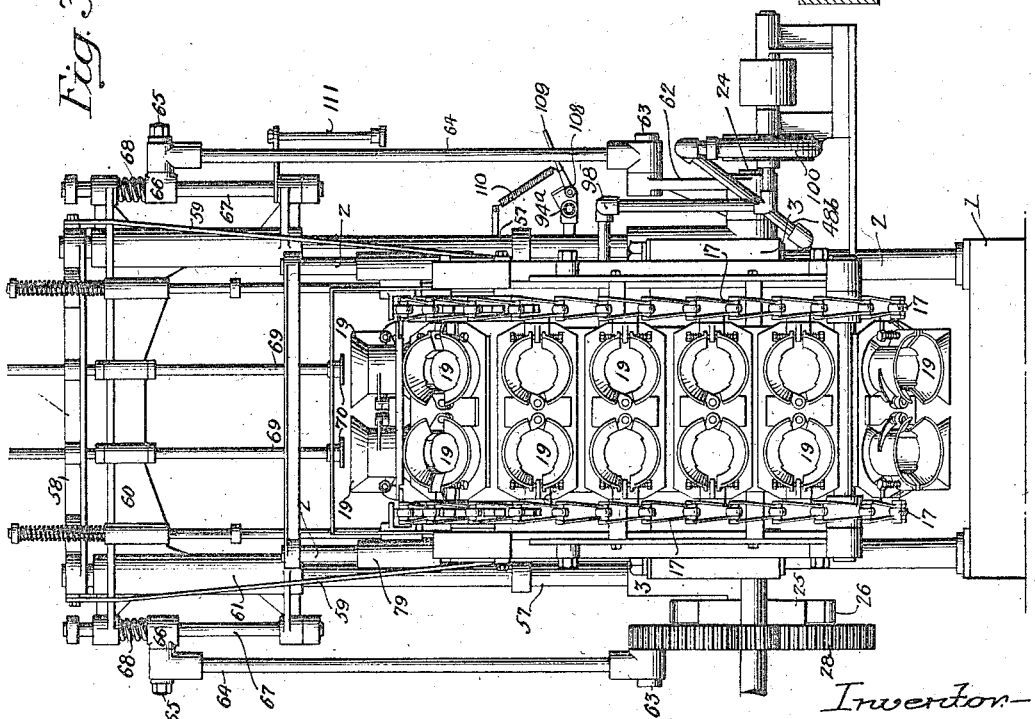
Inventor—
John T. Lally.
by his Attorneys
Howson & Howson

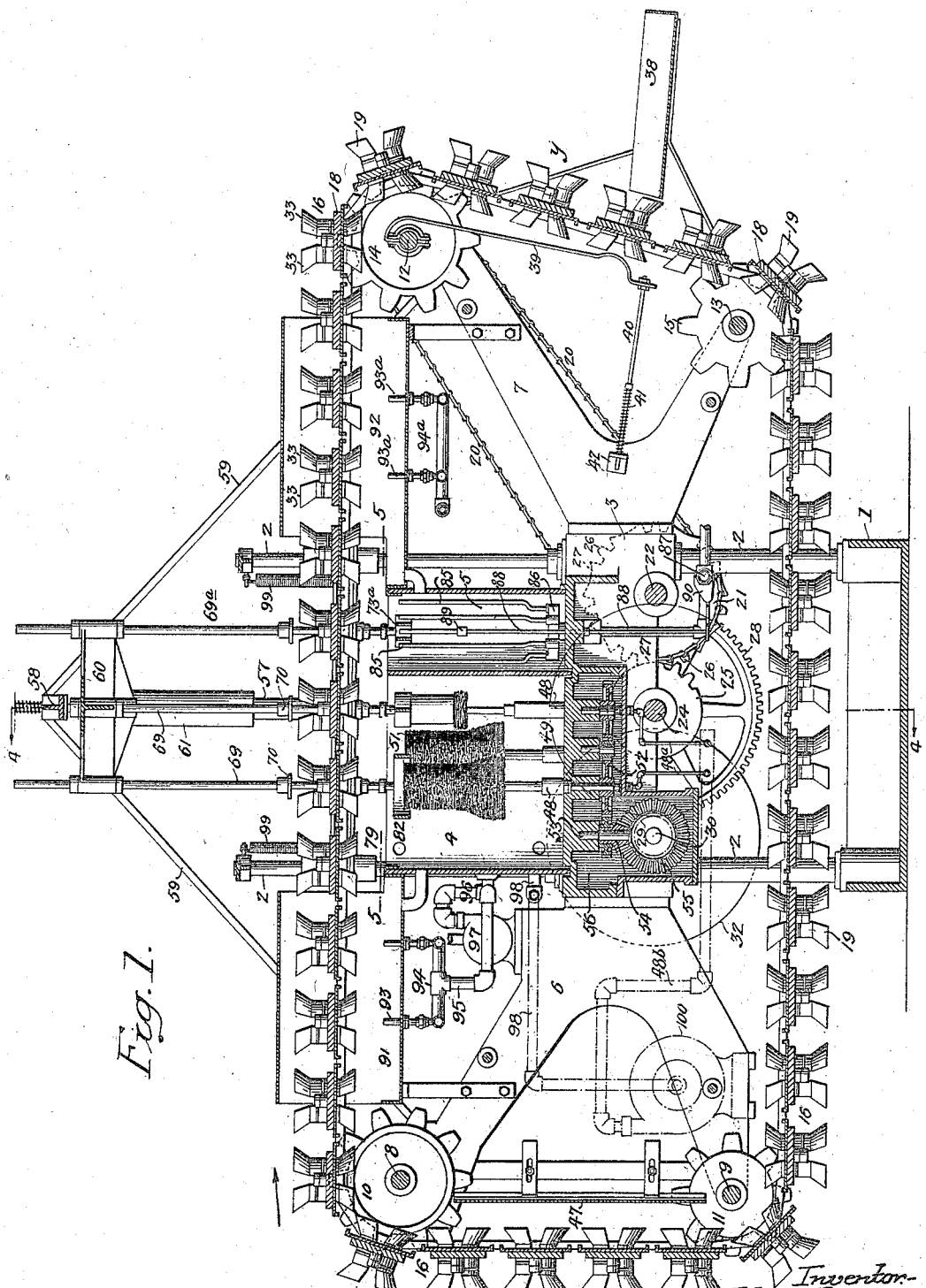

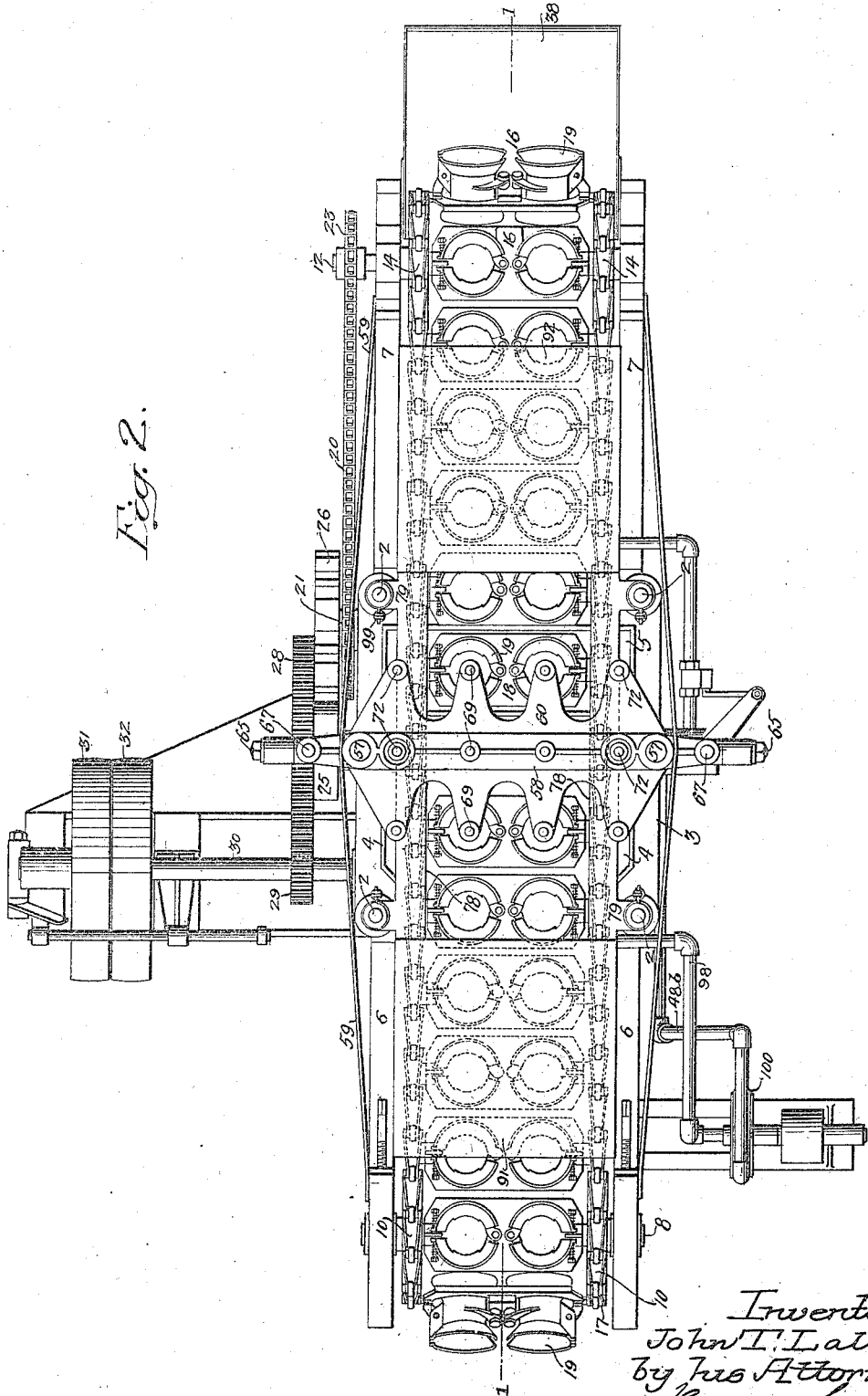

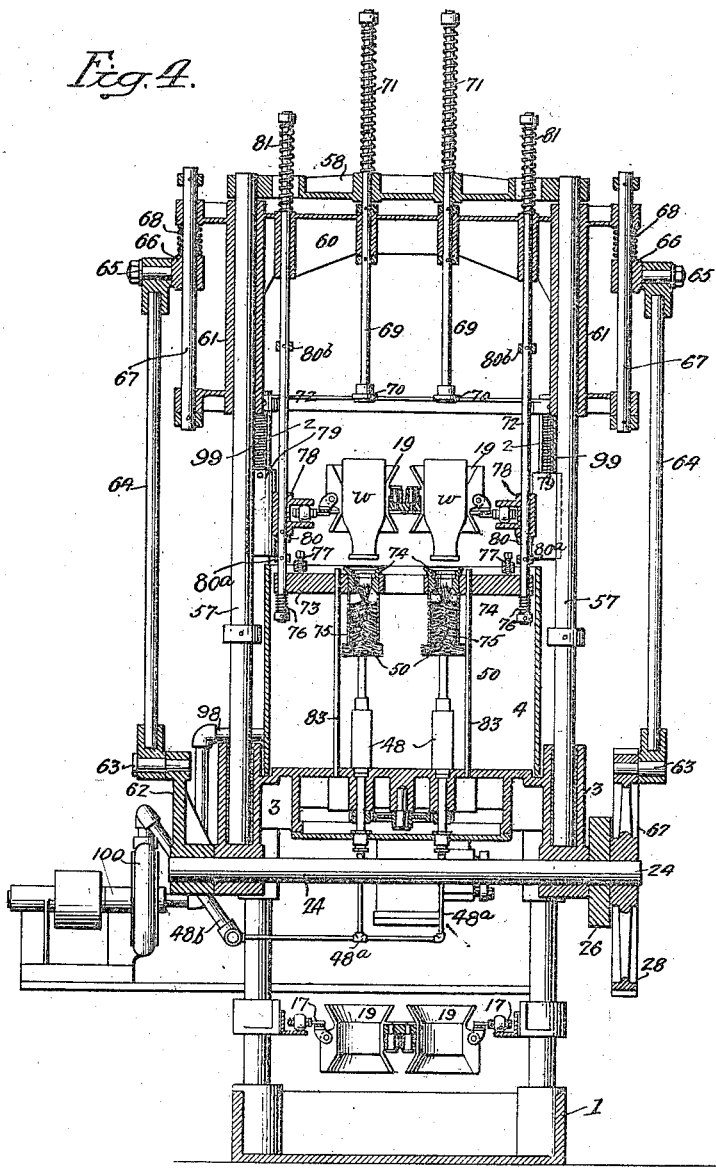

J. T. LALLY.
BOTTLE WASHING MACHINE.
APPLICATION FILED SEPT. 23, 1916.

1,242,817.

Patented Oct. 9, 1917.
7 SHEETS—SHEET 5.

Inventor-
John T. Lally.
by his Attorneys.
Howson & Howson

J. T. LALLY.
BOTTLE WASHING MACHINE.
APPLICATION FILED SEPT. 23, 1916.

1,242,817.

Patented Oct. 9, 1917.
7 SHEETS—SHEET 6.

Inventor—
John T. Lally.
by his Attorneys,
Howson & Howson

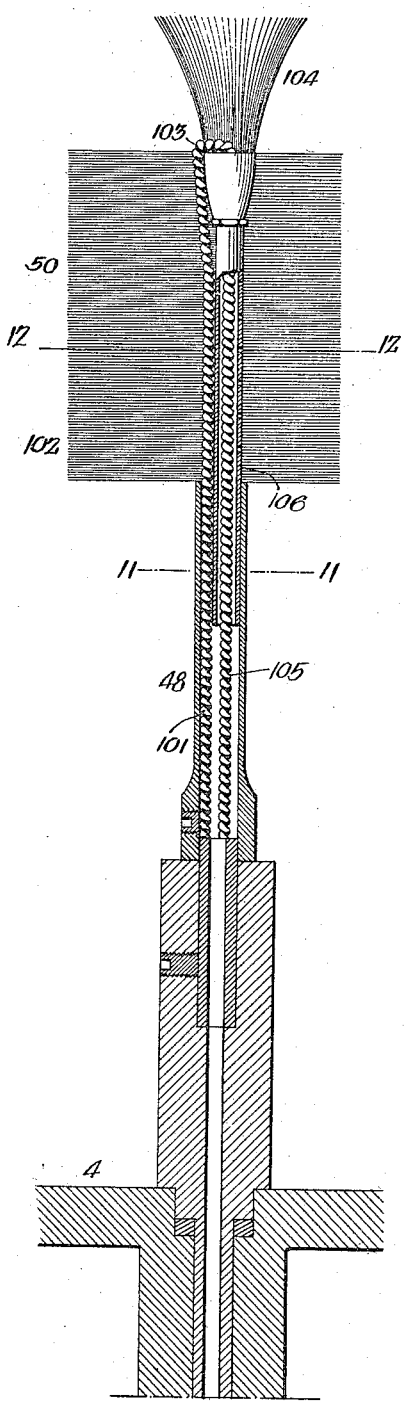
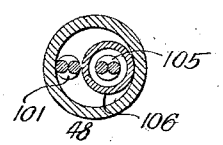
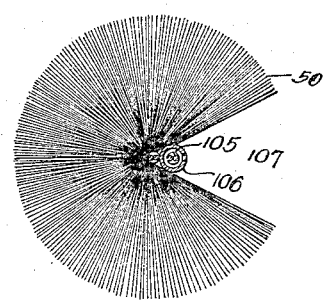

UNITED STATES PATENT OFFICE.

JOHN T. LALLY, OF WILMINGTON, DELAWARE, ASSIGNOR, BY DIRECT AND MESNE ASSIGNMENTS, TO NATIONAL BOTTLE WASHING MACHINE COMPANY, OF WILMINGTON, DELAWARE, A CORPORATION OF DELAWARE.

BOTTLE-WASHING MACHINE.

1,242,817.  Specification of Letters Patent.  Patented Oct. 9, 1917.

Application filed September 23, 1916. Serial No. 121,752.

*To all whom it may concern:*

Be it known that I, JOHN T. LALLY, a citizen of the United States, and a resident of Wilmington, county of New Castle, State of Delaware, have invented certain Improvements in Bottle-Washing Machines, of which the following is a specification.

My invention relates to certain improvements in machines for automatically washing bottles, particularly milk bottles, but it will be understood that the invention can be used for washing any type of bottle that can be handled in a machine.

One object of the invention is to provide a machine in which the bottles can be fed to the machine at one end and automatically discharged therefrom at the opposite end and which will be acted upon by brushes in a suitable vessel so as to thoroughly scrub the interior and exterior of a bottle after which each bottle is thoroughly rinsed.

A further object of the invention is to provide means for sterilizing the bottles.

A still further object of the invention is to provide means for holding the bottles on an endless chain and means for engaging and discharging the bottles so that all parts of each bottle will come in contact with the brushes.

These objects I attain in the following manner, reference being had to the accompanying drawings, in which:

Figure 1 is a longitudinal sectional view on the line 1—1, Fig. 2, illustrating my improved bottle washing machine;

Fig. 2 is a plan view;

Fig. 3 is an end view looking at the front end of the machine;

Fig. 4 is a sectional view on the line 4—4, Fig. 1;

Fig. 9 is a sectional view on the line 9—9, Fig. 5; showing the bottles in the washing tank under the action of the brushes;

Fig. 10 is a sectional view of one of the brushes for scrubbing the interior of the bottles;

Fig. 11 is a sectional view on the line 11—11, Fig. 10.

Fig. 12 is a sectional view on the line 12—12, Fig. 10.

Figure 5:
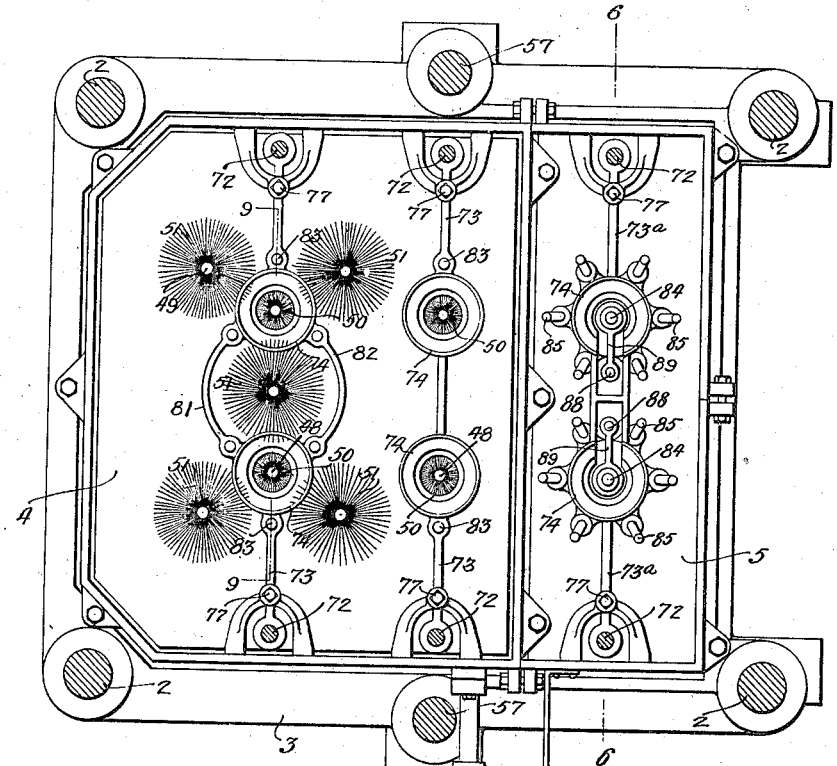
Fig. 5 is an enlarged sectional plan view on the line 5—5, Fig. 1, showing the brushes and the rinsing jets.

Referring to the drawings, 1 is the base of the machine having four standards 2 on which the entire apparatus is mounted. 3 is a frame on which is supported the washing tank 4 and the rinsing tank 5. This frame also supports the driving mechanism. At each end of the frame 3 are arms 6 and 7. The arms 6 project to the forward end of the machine and carry the shafts 8 and 9 on which are mounted the sprocket wheels 10 and 11, while the frame 7 carries the shafts 12 and 13 on which are mounted the sprocket wheels 14 and 15. 16 is an endless carrier consisting of two endless chains 17 connected at intervals by cross plates 18 to the links of the chain. Mounted on each cross plate are chucks 19 which hold the bottles to be cleansed. In the present instance, each cross plate carries two chucks, but it will be understood that a single chuck may be mounted on the plate or, in some cases, more than two. The shaft 12 carrying the sprocket wheels is a driven shaft, being driven by means of a chain 20 which passes around a sprocket wheel 21 on a shaft 22 and around the sprocket wheel 23 on the shaft 12. The shaft 20 is intermittently operated from a main shaft 24 mounted in bearings in the frame 3. The shaft 22 is also mounted in bearings in this frame and on the shaft 24 is a lock gear 25 having two teeth. These teeth mesh with the teeth on a wheel 26 spaced apart by a lock section 27 so that at each revolution of the shaft 24 the shaft 22 and the carrier are turned a given distance, the wheel 26 being locked during these movements. On the shaft 24 is a gear wheel 28 which meshes with a pinion 29 on a driving shaft 30 on which are fast and loose pulleys 31 and 32.

The object of making the shaft 22 and the carrier to move intermittently is to allow the bottles to be pushed out of the chucks and into the washing tank and also to permit the bottles to be returned to the chucks after being washed. The bottles to be rinsed are then projected from the chucks and after being rinsed are returned to the chucks. Each chuck consists of two sections 33 pivoted together at 34 and to a cross plate 18 of the carrier, there being openings 35 in the plate, as clearly shown in Fig. 7, and each chuck is flared at the upper end, as at 36, and at the lower end, as at 37, so that the bottles can be readily placed in the chucks and the mechanism can reënter the bottles into the chucks after they are washed and after they are rinsed.

The bottles are fed by hand into the chucks at the forward end of the machine at the point $x$ and are automatically discharged from the machine at the point $y$ and, in the present instance, are delivered onto a tray 38 by a spring-pressed plate 39 which is secured to a sleeve loosely mounted on shaft 12, while the lower end is attached to a rod 40 forced outward by a spring 41 bearing against a lug 42 on one of the arms 7. The plate 39 is so proportioned that as each bottle comes in line with the enlargement thereon it is forced out of the chuck and onto the tray.

Figure 7:
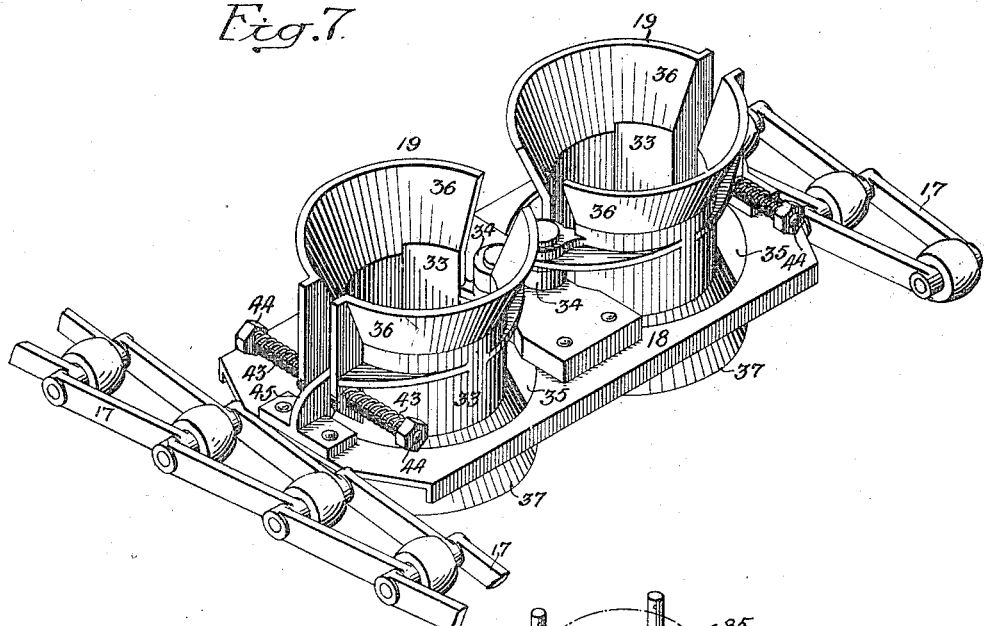
Fig. 7 is a perspective view showing a pair of chucks and a part of the endless chain.

The members 33 of the chuck 19 are yieldingly held in the closed position by springs 43 which are mounted on bars 44 which pass through lugs 45 secured to the cross plate 18 and on these bars 44 are nuts to regulate the pressure of the springs so that while the chucks firmly grip the bottles and hold them with sufficient firmness so that they can be carried they can be projected by force out of the chucks and can be forced into the chucks again when the washing and rinsing operations are completed. In order to center the bottles properly in the chucks, the chucks are preferably cut away at each side, leaving a central bearing, as shown in Fig. 7. This bearing portion will properly center the bottles even if they differ slightly in diameter and will hold them firmly.

At the forward end of the machine is an adjustable plate 47 which limits the inward movement of the bottle when placed in the machine by hand. This plate 47 can be adjusted and held in the position to which it is adjusted so that the machine will accommodate bottles varying in size.

Mounted in the washing tank 4 is a series of spindles 48 and 49. The spindles 48 carry the brushes 50 and the spindles 49 carry the brushes 51. The brushes 50 enter the interior of each bottle, while the brushes 51 travel in contact with the exterior of each bottle and clean the exterior surfaces thereof. The spindles are driven from a train of gears 52 from a shaft 53, on which is a pinion 54 which meshes with a beveled gear wheel 55 on the shaft 30 so that as the shaft is rotated the spindles and their brushes are also rotated.

The gearing above described is preferably mounted in a closed chamber 56 so that it is not necessary to have stuffing boxes at the bearings for the spindles and this chamber may be so arranged as to contain a lubricant.

57, 57 are standards mounted in sockets in the frame 3. 58 is a cross head connecting the upper end of the two standards. 59, 59 are braces extending from the cross head to the arms 6 and 7, as clearly shown in Fig. 1. Arranged to move vertically on the standard 57 is a sliding frame 60 having long bearings 61 through which the standards extend and this frame is moved vertically by means of cranks 62 on the shaft 24. The wheel 28 on this shaft forms one of the cranks 62 and the crank pins 63 are connected by rods 64 to pins 65 on sliding blocks 66 which are mounted on rods 67 carried by the sliding frame 60. On the rods 67 are coiled springs 68, which cushion the movement of the blocks 66 on their upward stroke.

Carried by the frame are four plungers 69 and two plungers 69$^a$ having heads 70 which bear upon the bottoms of the inverted bottles $w$, Fig. 4, and these plungers extend through openings in the cross head 58, and mounted between collars on the upper end of the plungers and the cross head are springs 71 which retract the plungers on the return movement of the cross head. The four plungers 69 are in line with the washing tank and the two plungers 69$^a$ are in line with the rinsing tank.

Also carried by the sliding frame 60 are rods 72 which carry the cross head 73 located in the washing tank 4 and having openings in which are mounted rings 74 shaped to receive the mouth end of the bottle $w$. The lower ends of these rings are beveled so as to allow them to pass freely over the brushes 50. There are extensions 75 below these rings on the cross head 73, as shown in Fig. 4, which compress the brushes as they are passed through them. Between the heads on the rods and the under side of the cross head 73 are springs 76 and adjustable stops 77 limit the upward movement of this cross head. The rods 72 pass through guides 78 on a frame 79 mounted on fixed standards 2 and suspended from springs 99 attached to the upper ends of the standards.

The frame 79 carrying the guide 78 for the endless carrier has a short vertical movement so as to allow the mouths of the bottles to engage the rings 74 so that on the movement of the sliding frame 60 a collar 80 which supports the guide frame is lowered, allowing the mouth end of a bottle to come in contact with the rings and on the continued movement of these rods a collar 80$^a$ comes in contact with the plate 73 carrying the rings, while on the still further movement the frame 60 comes in contact with the collar 80$^b$ and forces the plate 73 down at the same time the plungers 69 come in contact with the bottoms of the bottles and force them out of the chucks. On the return movement, the plate 73 is raised, as well as the plungers 69, and the bottles are returned to their chucks and on the continued movement the collar 80 raises the guide frame 79 so as to lift the carrier in which the bottles are mounted in order that the mouth end of a bottle may clear the mechanism to allow the carrier to move forward.

The frame 73 at the first set of brushes differs from that of the second set in that the parts are connected by arch members 81 and 82 to allow freedom for the central brush 51 which bears against the outer surface of the two adjoining bottles. The connecting member of the second frame is straight.

When the bottles enter the washing chamber and pass over the first set of brushes, they also pass in contact with the outside brushes 51, said brushes being spaced apart so that three brushes are in contact with the surface of each bottle, but in the second set the outside brushes are dispensed with and only the inside brushes engage the bottles. The cross heads 73 are guided by rods 83 projecting from the bottom of the washing tank 4.

By this construction it will be seen that on the proper timing of the machine the bottles are forced from the chucks onto the cross heads 73 by the plungers 69 and are carried down by the movement of the plungers 69 and cross head so that the brushes 50 enter the interior of the bottles and as these brushes rotate they thoroughly scrub the interior of the bottles, while the brushes 51 bear upon the outside of the bottles and scrub the exterior thereof.

On the upward movement of the cross head and the plungers, the bottles w are removed from the brushes and are again forced into the chucks, the carrier being moved forward a given distance so as to be in line with the second set of brushes, when the above operation is repeated, with the exception that the outer surfaces of the bottles are not scrubbed and only the inner surfaces are subjected to the action of the brushes. The bottles are then returned a second time to the chucks and are moved forward a given distance, when the plungers 69ª act with a cross head 73ª and carry the bottles from the chucks and into the rinsing tank 5. On the upward movement, they again lock the bottles in the chucks.

Figure 8:
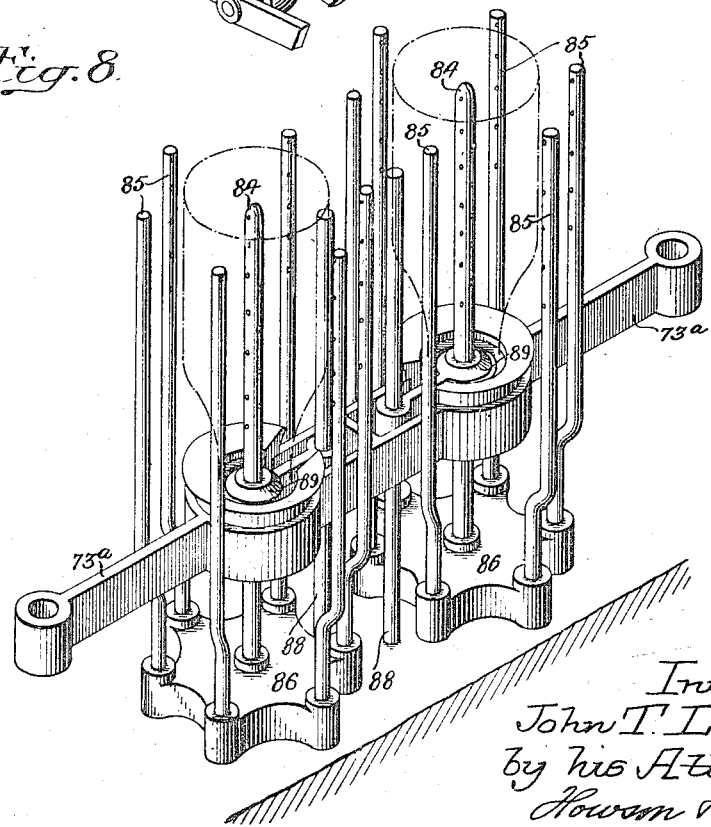
Fig. 8 is a perspective view showing the rinsing jets.

The rinsing, in the present instance, is accomplished by a series of jet pipes 84 and 85. There is a center pipe 84 adapted to enter the interior of the bottles and a series of pipes 85 which surround the bottles forming a single group. This group is mounted on a hollow head 86 which is supplied with water from a pipe 87 leading to any source of supply. The cross head 73ª passes in between the pipes, as shown clearly in Fig. 8, and carries with it the bottles, as illustrated in dotted lines in said figure.

Projecting from the bottom of the rinsing tank 5 at each nest of pipes is a trip rod 88 on which is a head 89 which surrounds the center pipe 84 so that as a bottle comes in contact with this head 89 in its downward descent it pushes the rod 88 down and turns the valve 90 in the pipe 87, allowing water to be projected through the small openings in the pipes 84 and 85, thus rinsing the interior and the exterior of each bottle. The pipe 87 leads to any suitable source of water supply.

I preferably locate a spray chamber 91 in front of the washing tank and a steam chamber 92 at the rear of the washing tank and situated so as to be in a direct line with the mouth of the bottles are nozzles 93 connected with water pipes 94. By this construction, the interior of each bottle is sprayed with water twice before being washed and rinsed and is subjected to a steam jet twice after being rinsed. This construction may be omitted in some types of washing machines where one rinsing will thoroughly cleanse the bottles, but where the bottles have been standing for a considerable length of time, it is desirable to provide these additional devices.

The pipe 94 may be connected with any suitable source of clear water, but I prefer to couple it with a pipe 95 leading from a solution tank which also communicates through a pipe 96 with the washing tank 4. I preferably provide a pump 97 which forces the solution under pressure into the tank 4 and through the jets 93, but where the solution tank is of sufficient height the pump may be dispensed with.

The water collected in the spray chamber 91 may flow into the tank 4 and the water of condensation from the steam chamber 92 may flow into the rinsing chamber 5. The usual overflow is provided for the tank 4 and when it is desired to heat the solution in the tank 4 then a steam jet may be provided so as to project steam into the tank and thus heat the contents.

In the steam box 92 are two nozzles 93ª attached to a steam pipe 94ª leading to any suitable source of supply. The jets of steam projected from the nozzles tend to sterilize the interior of the bottles.

I preferably make the brushes for the interior of the bottles in the manner shown in Figs. 10 and 11, making the spindles hollow to allow water to pass through the spindles and into the bottle so as to insure the proper circulation of water.

The tubular spindles 48 are connected to pipes 48ª which in turn are connected to a pipe 48ᵇ communicating with the pump 100, driven in any suitable manner. The pump, in the present instance, is connected to the tank 4 through a pipe 98.

The brushes are all made by twisting a wire 101 and holding the bristles 102 in the twist, then the wire is bent at 103, turning up a portion 104 of the bristles to come in contact with the bottom of the bottles and the portion 105 of the wire is passed through the tubular extension 106 of the spindle 48 and into the hollow spindle, as shown in Fig. 10. The extension 106 is perforated, as shown, to allow the water to escape from the tube. The space 107 left by forming the brush in the manner above set forth allows for the free escape of the water.

The operation of the machine is as follows:

The mechanism is driven at a given speed and the carrier 16 is moved intermittently the distance equal to the space between two sets of chucks. The bottles are fed by hand to the chucks at the forward end of the machine at the points x and the plate 47 limits the inward movement of the bottles and they are carried forward in the direction of the arrow until the first bottle comes in line with the first jet 93. Then water escaping from the jet enters the interior of the bottle, giving it the primary wetting. The carriage is then moved intermittently to a point in line with the second jet and the operation is again repeated. This thoroughly moistens the interior so that as it is moved in line with the first set of brushes it is ready to be thoroughly scrubbed. The carrier frame 79 is moved down so that the mouth ends of the bottles will come in contact with the rings 74, and the plungers 69 are moved in contact with the bottom of the bottles. Thus the bottles are clamped between the plungers 69 and the plates 73 and are carried by these two elements into the washing chamber 4, being forced out of the chuck by the downward movement of these elements. The brushes 50 enter the interior of the bottles while the brushes 51 bear against the outer surfaces thereof and as these brushes are rotated they thoroughly cleanse the interior and the exterior of each bottle.

On the upward movement of the plate 73 and the plungers 69, the bottles reënter their chucks and the guide frame is raised so that the mouth ends of the bottles will be clear of the rings 74. The parts are then in position to allow the carrier to be moved again a given distance. This brings the bottles that have been scrubbed, both on the exterior and on the interior surfaces, in line with the second set of brushes in the tank, when the above operation is repeated, with the exception that there are no brushes for cleaning the exterior of the bottles.

While water can be used in the tank 4, I preferably use any suitable cleansing solution.

On the next movement of the carrier the bottles are brought in line with the spray pipes 84 and 85, and the bottles are carried from their chucks into the rinsing tank 5 and jets of water are sprayed into the interior of the bottles through the pipes 84 and to the exterior of the bottles through the pipes 85. This is preferably clear water and the valve 90 is automatically actuated as the bottles enter the rinsing tank 5. The bottles after being returned to their chucks are carried forward and, in many instances, they are clean, but in order to subject the interior of each bottle to the action of steam I provide steam nozzles 93ª through which steam is projected into the interior of the bottles, as they are intermittently moved so that the bottles, on leaving the machine, are absolutely clean, having first been sprayed and then scrubbed both on the interior and on the exterior, and again scrubbed on the interior, then rinsed both on the inside and on the outside, and then sterilized on the inside. As the bottles come to the discharge point y the spring plate 39 automatically forces the bottles from their chucks into any suitable receptacle.

Figure 6:
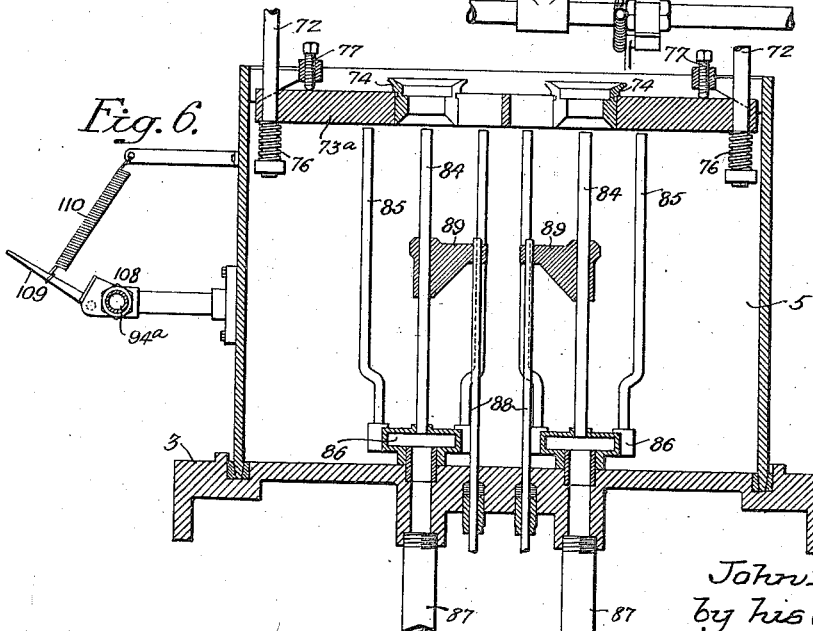
Fig. 6 is a sectional view on the line 6—6, Fig. 5.

In the present instance, I provide means for automatically operating the steam valve 108 which controls the flow of steam through the pipe 94ª, Figs. 3 and 6. This valve has an arm 109 held in the cut off position by a spring 110 and on the frame 60 is a plunger 111 which strikes the arm 109 when the frame is lowered. This movement takes place when the carrier is at rest so that there are two bottles directly over the nozzles 93ª.

I claim:

1. The combination in a bottle washing machine, of an endless carrier; means for intermittently moving the carrier; spring chucks mounted on the carrier for holding the bottles; a washing tank; rotating brushes in the washing tank; and means for carrying the bottles out of the chucks and into the washing tank so as to come under the action of the brushes and for returning the bottles to the chucks.

2. The combination in a bottle washing machine, of an endless carrier; a series of spring chucks mounted on the carrier for holding the bottles; a washing tank; a series of spindles in the tank; means for rotating the spindles; brushes on the spindles; a plate carrying rings in line with the mouths of the bottles; plungers; means for operating the plungers and the plate so that a bottle is held between the two; means for operating the said parts so as to force the bottles out of the spring chucks into the tank and in contact with the rotating brushes; and means for returning the mechanism so that the bottles will reënter the chucks prior to the forward movement of the carrier.

3. The combination in a bottle washing machine, of an endless carrier; means for driving the carrier; a series of spring chucks for holding the bottles mounted on the carrier; a fixed washing tank; spindles projecting up through the bottom of the tank; brushes on the spindles arranged to engage and grip the bottles; means for driving the spindles; means for engaging the bottles and for forcing them out of the chucks and into the washing tank and returning them from the washing tank into the chucks; a rinsing tank; and means for forcing the bottles out of the chucks into the rinsing tank and back into the chucks.

4. The combination in a bottle washing machine, of an endless carrier consisting of two chains and cross plates spaced a given distance apart; openings in the cross plates; spring chucks each consisting of two jaws yieldingly held in the closed position so that a bottle can be inserted in the chucks and held therein by friction; a washing tank; means in the washing tank for cleansing the bottles; means for carrying the bottles out of the chucks and into the washing tank so as to come in contact with the cleansing means; and means for returning the bottles to their chucks.

5. The combination of an endless carrier; chucks mounted on the carrier for yieldingly holding the bottles; a washing chamber; vertical spindles in the washing chamber; brushes mounted on the spindles and spaced apart so that some of the brushes will enter the bottles while others will bear upon the outside thereof; means for forcing the bottles out of the chucks and for carrying them into the washing tank and for returning the bottles to the chucks; a rinsing tank; a series of perforated tubes in the said tank; means for forcing the bottles out of the chucks and into the tank so that they will be sprayed on the inside and on the outside; and jets located in advance of the washing tank and at the rear of the rinsing tank for spraying the bottles before and after they are cleansed.

6. The combination in a bottle washing machine, of an endless carrier; chucks carried thereby; means for intermittently moving the carrier; a rinsing tank; perforated tubes located in the tank; a pipe communicating with the tubes; a valve in said pipe; an operating rod for the valve extending into the tank; means for forcing the bottles out of the chucks and for carrying them into the spray tank and for returning the bottles to the chucks, said bottles actuating the valve rod so as to cause water to be sprayed onto the bottles while they are in the tank but automatically cutting off the water as soon as the bottles are removed from the tank.

7. The combination in a bottle washing machine, of an endless carrier; means for intermittently moving the carrier; a series of yielding chucks mounted on the carrier for clamping the bottles and for carrying them through the machine; a washing tank; rotating brushes in the tank, a spray tank; a rinsing tank having a spray pipe therein; means in advance of the washing tank for projecting jets of water into the bottles prior to their entering the washing chamber; means for projecting steam into the bottles after they have left the rinsing tank; and means for removing the bottles from the chucks and for carrying them into the washing chamber and into the spraying chamber and for returning them into the chucks.

8. The combination in a bottle washing machine, of an endless carrier; means for intermittently moving the carrier; yielding chucks for the bottles mounted on the carrier; a washing tank; means in the washing tank for cleansing the bottles; means for forcing the bottles out of the chucks and into the tank and for carrying them back into the chucks; and a spring for automatically discharging the bottles from the chucks at the rear of the machine.

9. The combination in a bottle washing machine, of an endless carrier; means for intermittently moving the carrier; spring chucks for holding the bottles while they are being conveyed; a rotating shaft; cranks on said shaft; a sliding frame to which the cranks are connected; plungers carried by the sliding frame; a washing tank; brushes in the tank for scrubbing the bottles; a plate carrying rings; rods connecting the plate with the sliding frame so that on the downward movement of the frame the bottles will be clamped between the rings and the plungers and will be forced from the spring chucks and into the tank in contact with the brushes and will be returned by the said mechanism to the chucks.

10. The combination in a bottle washing machine, of an endless carrier; means for intermittently moving the carrier; chucks mounted on the carrier; a guide frame for the carrier; a tank directly below the guide frame; a plate mounted in the tank; clamps arranged in line with the bottles; a sliding frame; and means for actuating the frame so that the bottles will be clamped between the plungers and the rings on the plate and will be forced out of the chucks and into the tank and will be returned to the chucks.

11. The combination in a bottle washing machine, of an endless carrier; a series of yielding chucks mounted on the carrier; means for intermittently moving the carrier; a tank; guide frames on each side for guiding each side of the carrier above the tank; a sliding frame; means for reciprocating said frame; a plunger mounted on the frame and arranged to engage the bottom of a bottle; a spring on the plunger for returning the plunger; a plate located in the tank; a cap on the plate arranged to engage the mouth of a bottle; rods actuated by the sliding frame and controlling the movement of the guide frame and the plate so that the guide frame and carrier will be lowered in order that the mouth of a bottle may come in contact with the ring in the plate and the plunger will come in contact with the bottom of a bottle, forcing the bottle out of the chuck and into the tank and on the return movement the bottles will re-enter the chucks and the guide frame will be raised so that the mouth of a bottle will be clear of the ring.

12. The combination in a bottle washing machine, of a carrier for bottles; means for intermittently moving the carrier; a washing tank; rotating brushes in the washing tank; chucks; means for carrying the bottles from the chucks and into the washing tank; a steam box located in advance of the washing tank and through which the carrier for the bottles extends; a steam pipe having a nozzle projecting into the steam box and in line with a bottle when the conveyer is at rest; a valve for controlling the flow of steam to the nozzle; an arm on the valve; and a plunger carried by the means for moving the bottles into and out of the washing tank and arranged to actuate the arm of the valve to allow steam to be projected into a bottle when the conveyer is at rest.

JOHN T. LALLY.

Copies of this patent may be obtained for five cents each, by addressing the "Commissioner of Patents, Washington, D. C."